United States Patent

Cannelli, Jr.

[11] Patent Number: 5,992,036
[45] Date of Patent: Nov. 30, 1999

[54] TOOL FOR INSTALLING ELECTRICAL OUTLET BOXES

[76] Inventor: Victor Cannelli, Jr., 120-A Genesee La., Madison, Conn. 06443

[21] Appl. No.: 08/998,721

[22] Filed: Dec. 29, 1997

[51] Int. Cl.⁶ ........................................ B25B 11/00
[52] U.S. Cl. .......................................... 33/528; 33/DIG. 10
[58] Field of Search ............................. 33/528, 549, 613, 33/645, DIG. 10; 269/904, 3

[56] References Cited

U.S. PATENT DOCUMENTS

| | | | |
|---|---|---|---|
| 2,919,913 | 1/1960 | Phair | 33/DIG. 10 |
| 2,956,798 | 10/1960 | Briggs | 269/904 |
| 2,962,281 | 11/1960 | Hodgson | 269/904 |
| 2,990,172 | 6/1961 | Gianotta | 33/DIG. 10 |
| 3,436,070 | 4/1969 | Utley et al. | 33/528 |
| 3,751,026 | 8/1973 | Stickney | 269/904 |
| 3,875,669 | 4/1975 | Hull | 33/528 |
| 3,954,717 | 5/1976 | Tarr | 269/904 |
| 4,126,941 | 11/1978 | Clarke | 33/DIG. 10 |
| 4,181,295 | 1/1980 | Duffy | 269/904 |
| 4,635,372 | 1/1987 | Tande | 33/DIG. 10 |
| 4,750,271 | 6/1988 | Erickson | 33/613 |
| 4,850,115 | 7/1989 | Price et al. | 33/528 |
| 4,888,879 | 12/1989 | Dixon | 33/613 |
| 4,901,447 | 2/1990 | Gottschalk | 33/613 |
| 5,072,523 | 12/1991 | Bennett | 33/528 |
| 5,111,593 | 5/1992 | Gehen, Sr. | 33/DIG. 10 |

*Primary Examiner*—G. Bradley Bennett
*Attorney, Agent, or Firm*—Robert H. Montgomery

[57] ABSTRACT

A tool for positioning and installing an electrical utility box which comprises a block member having a vertical slot in the rear wall which compressively receives the side wall of an electrical utility box and positions the box for attachment to a stud with a predetermined outset from the face of the stud in accordance with the thickness dimension of the finished wall.

18 Claims, 1 Drawing Sheet

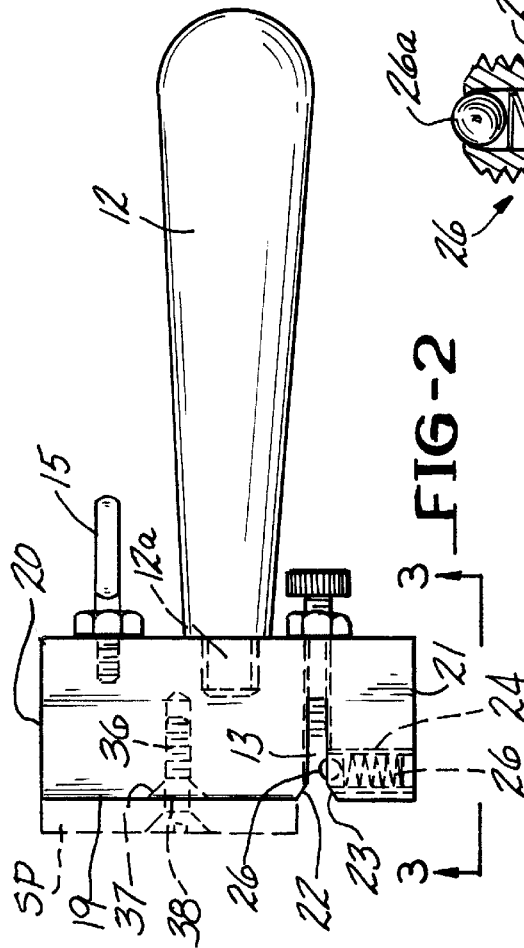
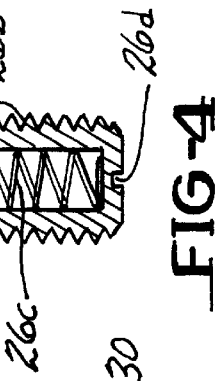
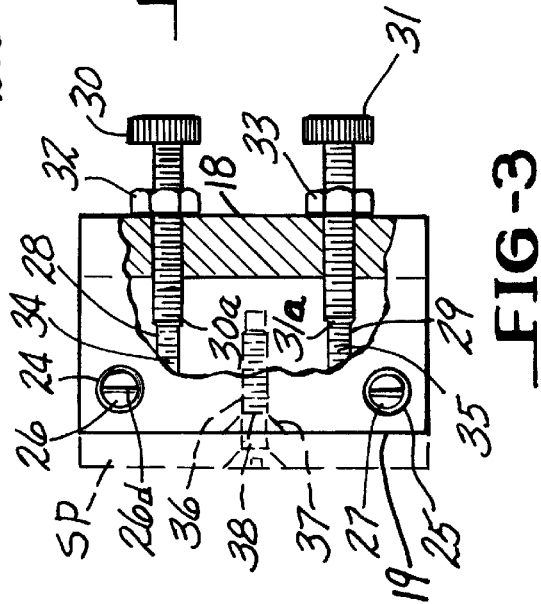
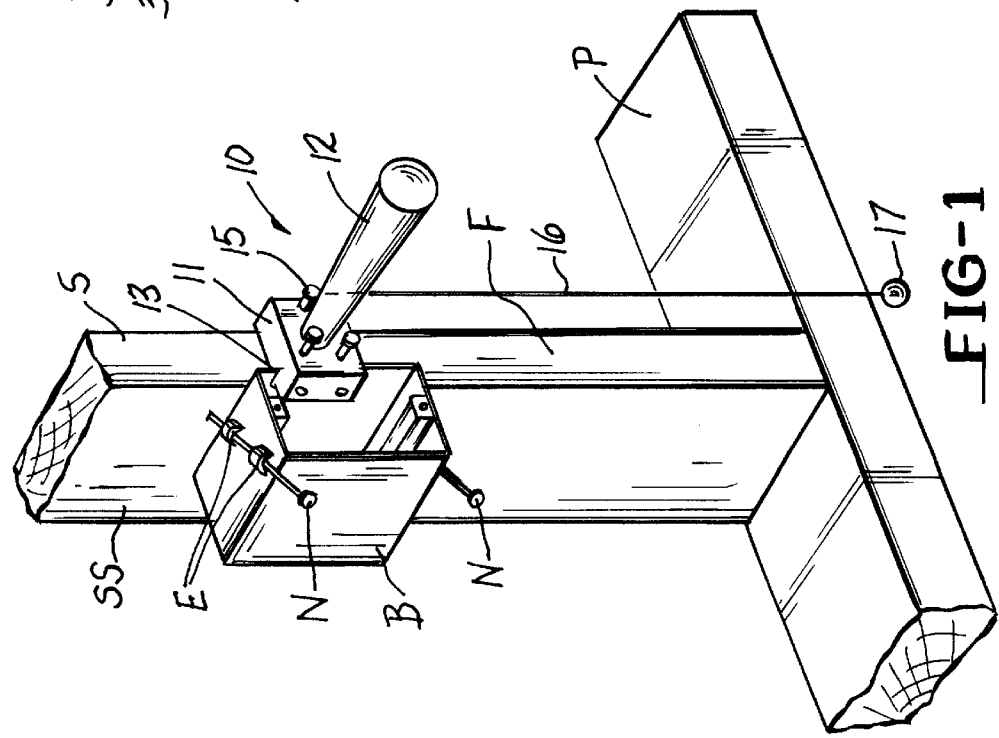

TOOL FOR INSTALLING ELECTRICAL OUTLET BOXES

FIELD OF THE INVENTION

This invention relates to a new and improved tool for positioning and installing single or multi-ganged electrical outlet boxes in wall studs in building construction.

BACKGROUND OF THE INVENTION

In wood frame building construction the common practice for installing electical outlet boxes is to nail the box to a stud with a projection beyond the stud which will meet the dimension of the outside surface of the finished wall, usually what is refered to as sheetrock or wall board, which may vary in thickness. The same is true with respect to metal studs in commercial and industrial buildings except that screws are used to secure the boxes to formed metal or other non-wooden studs.

Therefore, the electrician or his helper installing the boxes must correctly position the boxes in accordance with the specified thickness of the finished wall, as well as the usual heights for boxes for switches and boxes for female wall plugs.

In recent years the use of plastic outlet boxes with diagonally directed securing nails or screws has grown. However, when nails or screws are diagonally directed the direction of the nails tends to move the box from a predetermined position and it is difficult to maintain the position of the box with respect to a stud and the thickness of the wall to be installed.

In some cases wooden studs do not have square corners, that is a portion of a corner is missing due to a knot or other abnormality in the wood when it is milled. This may occur at the heights where boxes are conventionally installed.

A tool embodying the invention is constructed to hold a box against a side surface of a stud for attachment thereto even though the corner of the stud is not square.

Many tools have been proposed for the positioning of electrical utility boxes as exemplified in U.S. Pat. Nos. 2,956,798; 2,962,281; 2,990,172; 3,751,026; 3,875,669; 3,954,717; 4,12,941; 4,181,295; 4,635,372; 4,750,271; 4,850,115; 4,888,879; 4,901,447; and 5,072,523.

However, most of these tools have been of fabricated construction and none of these tool types have been known to have been acceptable to installers.

Accordingly the present invention is intended to provide a tool for installing an electrical utility box which is of new and improved construction and which is simplified in use.

An object of this invention is to provide a new and improved tool for locating and installing an electical utitility box.

Another object of this invention is to provide a tool for locating, positioning and installing an electrical outlet box which tool is of simplified construction and easy for an installer to use.

A further object of this invention is to provide a tool of the type described which is very durable in construction and will stand up and be serviceable after many uses in any environment.

A still further object of this invention is to provide a tool for positioning and holding an electrical outlet box against a stud for attachment thereto even though the stud may have abnormalities at the corner where the box is to be installed.

SUMMARY OF THE INVENTION

Briefly stated, the invention in one form thereof comprises a block member having front, back and side walls with a handle extending from the front wall and a vertically directed slot in the block member opening through the back wall which receives a side wall of an electrical utility box. Biased holding means extend through one side wall into the slot to compressively engage a side wall of an electrical utility box in the slot. Depth setting means are accessible from the front wall for setting the dimension which the edges of the box can extend into the slot from the back wall and determine the extended distance of the box from the stud in accordance with the thickness of the finished wall.

The features of the invention which are believed to be novel are particularly pointed out and distinctly claimed in the concluding portion of this specification. The invention, however, together with further objects and advantages thereof, may best be appreciated by reference to the following detailed description taken in conjunction with the drawings.

DETAILED DESCRIPTION OF THE DRAWINGS

FIG. 1 is a perspective view of a tool embodying the invention as used to locate and hold an electrical outlet box for installation in wood frame construction;

FIG. 2 is a top plan view of the tool of FIG. 1;

FIG. 3 is a view seen in the plane of lines 3—3 of FIG. 2, and partially cut away; and FIG. 4 is a longitudinal half section of a ball spring plunger utilized in the invention.

DESCRIPTION OF PREFERRED EMBODIMENT OF THE INVENTION

FIG. 1 exemplifies in part a wood frame building construction which includes a plate P and a stud S. The sizes of the plate P and stud S may vary dependent on the type of construction, usually either two by four or two by six (nominal). Stud S has a front surface F to which a wall will be attached and a side surface SS to which the box B is attached.

A tool 10 embodying the invention is shown in contact with stud S on the front surface F thereof and holding box B against a side SS of stud S. Tool 10 comprises a block member 11 having a handle 12 attached thereto as for example by threading as indicated at 12a in FIG. 2. Block 11 has a vertically (as shown) directed slot 13 for receiving a sidewall of an electrical outlet box B. Box B may be a single or multi-gang box of either plastic, metal or fiberglass. As shown, box B is a common box typically made of molded plastic and has integral passages or ears E on top and bottom which receive diagonally directed securing nails N or screws on top and bottom (only top shown).

Block 11 may be of plastic, aluminum, steel or any composites thereof which are prefferably cut from rod stock or molded and capable of being drilled and tapped. The block 1 may be plated to resist wear.

As hereinafter exemplified tool 10 may have an attachment 15 thereon which receives a height indicator string or chain 16 which may carry a a weight 17 or plumb bob (not shown) thereon. Attachment 15 may be an eye bolt. As is hereinafter described, tool 10 will compressively hold a box B on either side of a stud S and provide a thickness gage for the dimension of the interior wall. Reference is now made to FIG. 2 which is a top plan view of tool 10 and also to FIG. 3 which is a view seen in the plane of lines 3—3 of FIG. 2. Tool 10 has a front wall 18, a back wall 19 and side walls 20 and 21. The edges defining the opening of slot 13 through back wall 19 are chamfered at 22 and 23 to facilitate entrance of a side wall of a box B into slot 13.

Defined in block 11 through wall 21 are upper and lower threaded passages 24 and 25 which receive threaded ball spring plungers 26 and 27, respectively, therein with the balls of the plungers extending into slot 13 to compressively engage a sidewall of a box B. Only box 26a of plunger 26 is shown in FIG. 2. The ball spring plungers 26 and 27, as shown in FIG. 4 with respect to plunger 26, are of a construction which is of an externally threaded exterior 26b with an internal spring or biasing means 26c extending ball 26a outwardly from one end thereof and having a slot 26d for receiving a turning tool such as a screw driver, at the other end thereof so that the depth of the biased ball in slot 13 may be varied in accordance with the thickness of the wall of a box B. The ball 26a is captured at the open end of plunger 26. Such ball spring plungers are available from Vlier Corporation of Brighton, Mass. in various diameters and lengths.

This permits adjustment of the ball spring plungers in accordance with the thickness of the sidewall of a box B so that the sidewall may be compressively and securely held in slot 13. For example, the sidewall of a plastic box may be 0.12 inch while the dimension of a metal box is only about one half of that dimension.

Also defined in block 11 are upper and lower threaded passages 28 and 29 (FIG. 3) which threaded passages receive therein threaded finger bolts 30 and 31, respectively, which extend into slot 13 to provide a wall thickness depth setting. Bolts 30 and 31 may carry thereon locking nuts 32 and 33, respectively. The ends 30a and 31a of bolts 30 and 31 extend into slot 13 as best seen in FIG. 3, and will set a dimension from back wall 19 to accurately position a box B from the surface F of a stud S.

In use, the depth adjustment bolts 30 and 31 are set for the thickness of the finished wall. Then a sidewall of a box B is compressively engaged in slot 13 by the biased balls of ballspring plungers 26 and 27 which have been set in accordance with the thickness dimension of the box wall. The user then determines the length of string or chain 16 for the height of the box, if this has not previously been done. The back wall 19 of block 11 is then positioned in contact against the front surface of a stud S at the measured vertical height and attachment nails In are driven into stud S. The nails In are also representative of threaded screws which are usually driven by a power tool. If the box B is of metallic construction, the attachment may be by either nails or screws. In either case tool 10 provides an accurate holding and positioning device for an electrical outlet box.

Depending on the diameter of bolts 30 and 31, grooves 34 and 35 may be provided in the sidewalls defining slot 13 when the passages 28 and 29 are first drilled and tapped. For example, slot 13 may be on-eighth inch wide and the bolts 30 and 31 of slightly larger diameter.

It is important to note that tool 10 is reversible and may be used on either side of a stud S merely by rotating handle 12 one hundred eighty degrees.

In some cases a stud S may be partially disfigured on a fronting surface or corner. However, tool 10 is effective so long as there is some fronting surface upon which the back wall 19 of block 11 may contact and be positioned with the sidewall of a box B against a side surface SS of a stud S. Tool 10 is effective to accurately position a box B with the desired outset from a stud S and square to a stud S. A box B may be quickly inserted into a tool 10 and then quickly located and positioned in relation to a stud S.

The dimension from slot 13 to sidewall 20 is preferably made the same dimension as the facing side F of stud S to insure that the box is positioned square to the stud in the event of any abnormal edges on the stud such as a knot, wood defect or milling which has produced a non-square corner. In the case of wooden studs the dimension would be one and one-half inches (1½").

In some cases the finished wall may be thicker than the depth of slot 13. An example is where a sheet of paneling is to be adhered to the surface of installed sheetrock.

Block 11 may have a threaded aperture 36 defined therein through back wall 19 which is counter sunk at 37 to receive a flat head bolt or screw 38 and the flat head thereof in normal usage is at least flush with wall 19.

When paneling is to installed over sheetrock (usually in sheets four feet wide), a piece of scrap paneling SP (shown in broken line) is secured to block 11 on back surface 19 by bolt or screw 38 with the flat head at least flush with the outside surface of the scrap piece SP. This effectively increases the depth of slot 13 by the thickness of the paneling and permits a box B to be located with its front edges at the outside surfaces of the paneling.

A tool embodying the invention is made of either metel or plastic, as previously pointed out. A tool embodying the invention may be used to position and attach an electrical outlet box to a stud of any material in which the box is designed to be fastened by screws or nails including plastic or composite studs. Where the screws are self drilling sheet metalscrews, the screws are easily fastened to a metal stud with a screw gun.

It may thus be seen that the objects of the invention stated above as well as those made apparent are efficiently attained. While a preferred embodiment of the invention has been set forth for purposes of disclosure, other embodiments as well as modifications to the disclosed embodiment may occur to others skilled in the art. Accordingly, the appended claims are intended to cover all embodiments of the invention as well as modifications to the disclosed embodiment which do not depart form the spirit and scope of the invention.

What is claimed is:

1. A tool for positioning an electrical utility box to a wall stud for attachment thereto comprising a block member having front, back and side walls and a handle attached thereto and extending from said front wall, a vertically directed slot in said block member opening through said back wall, biased holding means extending through a side wall of said block member into said slot adapted to compressively hold a sidewall of an electrical utility box in said slot, and depth setting means accessible from said front wall for setting the dimension which a sidewall of an electrical utility box can extend into said slot from said back wall.

2. The tool of claim 1 wherein said biased holding means comprise one or more ball spring plungers threaded into a side wall of said block member.

3. The tool of claim 2 wherein said one or more ball spring plungers are adjustable with respect to depth in said sidewall in accordance with the thickness of the side wall of an electrical utility box.

4. The tool of claim 1 wherein the edges defining the opening of said slot in said back wall are chamfered to facilitate insertion of a side wall of an electrical utility box therein.

5. The tool of claim 1 wherein said depth setting means comprises at least one finger bolt threadably received in said block member from said front wall and extending into said slot.

6. The tool of claim 1 further including height measuring means attached to said block member for gaging the height upon which an electrical utility box is to be positioned on a stud.

7. The tool of claim 6 wherein said height measuring means is a flexible string or chain depending from said block member a predetermined distance.

8. The tool of claim 1 wherein a threaded aperture is defined in said block through said back wall and receives a threaded flat head bolt or screw therein with the flat head being at least flush with said back wall.

9. The tool of claim 1 wherein the dimension of said block from said slot to a sidewall is essentially the same as the facing surface of a stud to which a box is to be attached.

10. A tool for positioning an electrical utility box to a wall stud for attachment thereto comprising a block member having front, back and side walls adapted to be held against the front wall of a stud, a vertically directed slot in said block member opening through said back wall, biased holding means extending through a side wall of said block member into said slot adapted to hold a side wall of an electrical utility box in said slot, and depth setting means accessible from said front wall for setting the dimension which a side wall of an electrical utility box can extend into said slot from said back wall.

11. The tool of claim 10 wherein said biased holding means comprise one or more ball spring plungers threaded into a side wall of said block member.

12. The tool of claim 11 wherein said one or more ball spring plungers are adjustable with respect to depth in said side wall in accordance with the thickness of the side wall of an electrical utility box.

13. The tool of claim 10 wherein the edges defining the opening of said slot in said back wall are chamfered to facilitate insertion of a side wall of an electrical utility box therein.

14. The tool of claim 10 wherein said depth setting means comprises at least one finger bolt received in said block member from said front wall and extending into said slot.

15. The tool of claim 10 further including height measuring means attached to said block member for gaging the height above a floor which an electrical utility box is to be positioned on a stud.

16. The tool of claim 15 wherein said height measuring means is a flexible string or chain depending from said block member a predetermined distance.

17. The tool of claim 10 wherein a threaded aperture is defined in said block through said back wall and receives a threaded flat head bolt or screw therein with the flat head being at least flush with said back wall.

18. The tool of claim 10 wherein the dimension of said block from said slot to a side wall is essentially the same as the facing surface of a stud to which a box is to be attached.

* * * * *